United States Patent [19]
Kleekamp

[11] 3,791,727
[45] Feb. 12, 1974

[54] MICROFORM READER PROJECTION LENS TRACKING MECHANISM

[75] Inventor: Robert L. Kleekamp, Dayton, Ohio

[73] Assignee: The National Cash Register Company, Dayton, Ohio

[22] Filed: July 21, 1971

[21] Appl. No.: 164,569

[52] U.S. Cl. ............................................. 353/101
[51] Int. Cl. ............................................ G03b 3/00
[58] Field of Search...................... 353/101, 22, 27

[56] References Cited
UNITED STATES PATENTS

| 3,424,524 | 1/1969 | Akiyama et al................... | 353/78 X |
| 3,072,013 | 1/1963 | Pratt.................................... | 353/27 |
| 3,320,854 | 5/1967 | Wally.................................... | 353/27 |
| 3,560,083 | 2/1971 | Brownscombe...................... | 353/27 |

OTHER PUBLICATIONS
IBM Tech. Disc. Bull. Constant Focus Image Projection Vol. 13, No. 7, 12/70

Primary Examiner—Harry N. Haroian
Attorney, Agent, or Firm—J. T. Cavender; Wilbert Hawk, Jr.; George J. Muckenthaler

[57] ABSTRACT

A mechanism for permitting a projection lens assembly in a microform reader to freely float during tracking operation wherein constant focus is maintained throughout the travel of the assembly across the cover plate of a microform carrier. A projection lens mounting member is supported by means of a connection adjacent the projection lens and a connection distal from the lens, the connections being of the lost-motion type to provide for such free floating of the lens assembly.

12 Claims, 3 Drawing Figures 3,791,727

INVENTOR
ROBERT L. KLEEKAMP
BY Wilbert Hawk, Jr.
HIS ATTORNEYS

MICROFORM READER PROJECTION LENS TRACKING MECHANISM

BACKGROUND OF THE INVENTION

One of the most important features of a dependable microform reader is that of maintaining focus of the lens system throughout numerous operations, whether these operations are the viewing of a number of frames on one microform or the viewing of frames from a number of microforms. It is generally a simpler matter to maintain the lens in focus when moving from one microimage frame to another on one microform as any lens adjustment required for a certain microform is performed one time and thereafter the lens stays in focus for all the frames on the form. However, when different microforms are inserted into the reader, variations between the microforms may require adjustment of the lens for each form. In this respect it is decidedly more important to have a projection lens with a mircroform tracking feature which accommodates not only all the frames on a specific microform but also the frames on a plurality of forms.

Various ways and means for supporting a projection lens assembly have been utilized wherein it is desired to keep the lens holder in continuous contact with the cover plate of the microform carrier. The lens holder must have sufficient force exerted thereon to derive such continuous contact with the cover plate, while at the same time, the holder support must be sufficiently flexible to enable unrestricted movement of the microform carrier thereunder, and take into account for slight variations in the surface of the microform. In addition to utilizing the weight of the projection lens assembly to maintain contact with the cover plate of the microform carrier, the prior art shows biasing means designed to exert a slight continuous pressure on the lens holder. A common expedient in this matter has been the use of a coil spring or the like to exert such slight downward pressure on the lens holder, yet is sufficiently resilient to permit the holder to respond to the slight variations in the microform. Inn line with this, it is important that the distance between the lens and the microimage be maintained constant for multiple operations of the image carrier.

Looking at the prior art, U. S. Pat. No. 3,320,854, issued on the application of J. H. Wally, Jr., shows and describes a projection lens assembly supported from an arm secured at one end thereof to a rotatable shaft, the contact of the lens assembly with the upper plate being realized from the weight of the assembly and its supporting arm.

Representative of such spring means, as mentioned above, to provide a biasing effect on the projection lens assembly, is shown and described in U. S. Pat. No. 3,424,524, on the application of H. Akiyama et al.

Another form of pressure exertion on the lens assembly is shown and described in a co-pending application, Ser. No. 851,858, filed Aug. 21, 1969 in the names of A. E. Peters and L. G. Miles, now U.S. Pat. No. 3,634,005 and assigned to the same assignee as the instant application, which patent shows a plurality of equally spaced leaf springs to maintain a tracking ring in contact with the upper glass plate.

SUMMARY OF THE INVENTION

The present invention relates to microform readers and more particularly to mechanism for providing independent mounting of the projection lens assembly so as to allow for free floating thereof on the cover plate of a microform carrier. An upper and a lower transparent plate carrying a microfiche therebetween and mounted on a framework movable in a side-to-side direction and in a fore-and-aft direction is positioned under the projection lens assembly. The lens assembly is carried by a mounting arm which is an integral part with a lens tracking sleeve and which arm extends rearwardly to be supported from a pair of block members secured to the reader framework. The mounting arm carries a pair of pivot pins, spaced from each other, and cooperating with apertures in the block members in the nature of lost-motion connections, wherein the mounting arm is free to move in an up-and-down direction and thus permit the lens assembly to float on the surface of the upper transparent plate during movement thereof. The block member nearest the lens assembly has an oversize aperture therein for receiving its pivot pin and allowing for a slight up-and-down and rocking movement of the lens assembly, whereas the block member farthest from the lens assembly has a vertically elongated slot therein for receiving its pivot pin and for allowing up-and-down movement of the lens assembly.

The lens assembly mounting arm is designed in conjunction with the mass of the assembly to support such assembly in a manner wherein the center of the gravity thereof is forward of the vertical axis of the lens and the loading of the lens assembly on the upper or cover plate is derived only from the weight of the lens assembly. In this manner, no additional mechanical or spring force is required to maintain continuous parallel contact between the lens tracking ring or bearing and the surface of the upper plate. When the lens assembly is tracking on the upper plate, the mounting arm is floating in the block members under a generally balanced condition to permit free movement of the lens assembly in relation to the surface of the upper plate.

In accordance with the above discussion, the principal object of the present invention is to provide mounting means for a projection lens assembly to permit floating of the assembly on the surface of the upper or cover plate of a microform carrier as the carrier is moved about in the operation thereof.

A further object of the present invention is to provide mounting means for a lens assembly which permits continuous contact of the assembly with the upper plate of a microform carrier by reason of the weight of the lens assembly.

An additional object of the present invention is to provide mounting means for a projection lens assembly wherein a plurality of lost motion connections allow for free floating movement of the lens assembly on the upper plate of the carrier.

Additional advantages and features of the present invention will become apparent and fully understood from a reading of the following description taken together with the annexed drawing, in which.

Figure 1:
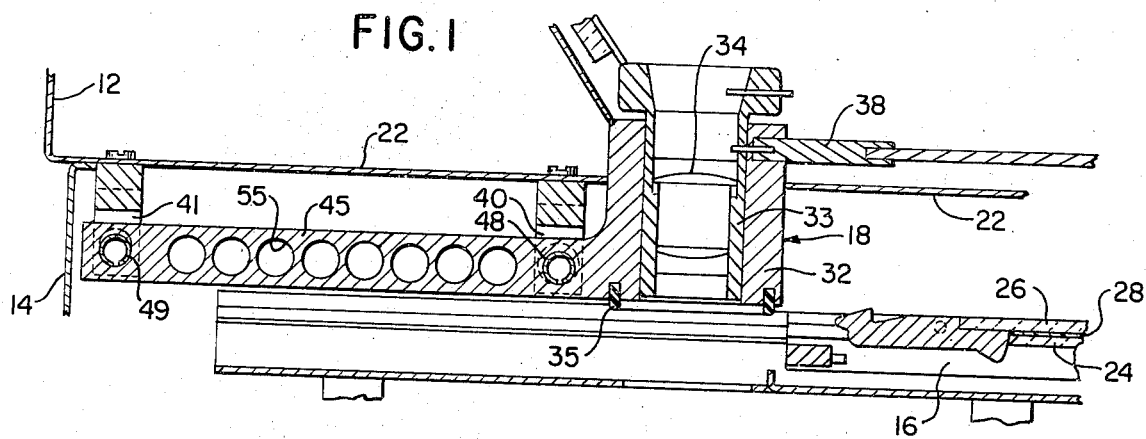
FIG. 1 is an elevational view, in sectional form, showing the lens assembly mounting means and wherein the microform carrier is removed from under the lens assembly and the assembly is fully supported from the block members.
Figure 2:
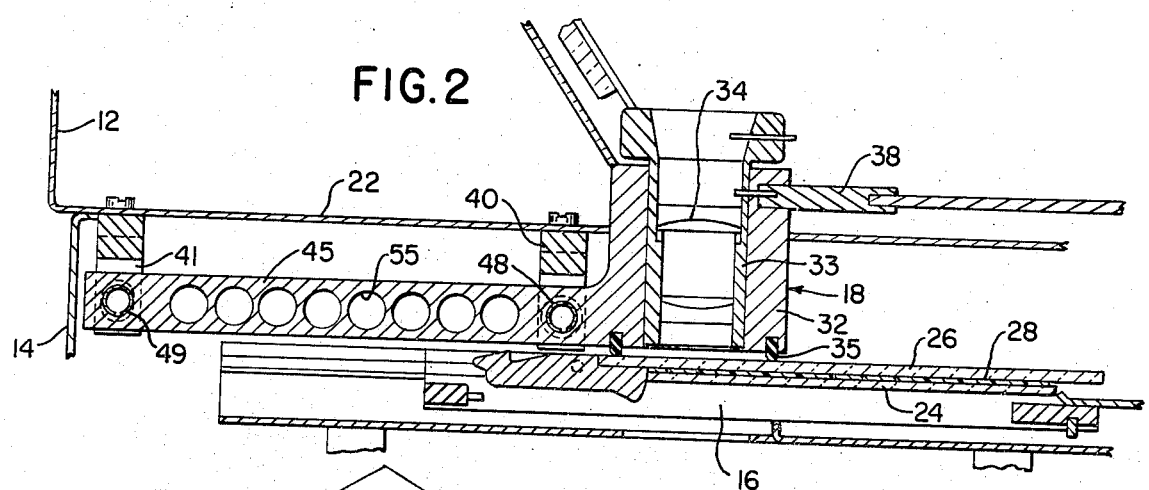
FIG. 2 is a similar view as FIG. 1 but showing the lens assembly resting on the upper glass plate of the microform carrier and wherein the lost motion connections of the mounting arm and block members permit the floating action of the lens assembly.

Referring to FIGS. 1 and 2, there is shown in fragmentary manner an upper portion 12 and a lower portion 14 of a housing for a microform reader, the housing containing a microform carrier 16, and a projection lens assembly 18. A source of light, a series of mirrors, and a viewing screen, although well-known in the art but not shown in the drawing, are generally included in a reader of this type for enlarging the microimages on the frames of a microform and for viewing by the operator. Additional details of the microform carrier 16 are shown and described in a co-pending U. S. application, Ser. No. 164,571 filed July 21, 1971 in the name of S. B. Smith, entitled "Microform Reader Cover Glass Opening Mechanism," and assigned to the same assignee as the present invention. Further disclosure of features associated with and similar to the structure of the present invention is found in the co-pending U. S. application, Ser. No. 851,858, filed Aug. 21, 1969, in the names of A. E. Peters and L. G. Miles, now U. S. Pat. No. 3,634,005 and assigned to the same assignee as the present invention.

As mentioned above, various ways and means have been provided in the past for supporting a projection lens assembly so as to maintain contact of the assembly with the upper plate of a microform carrier and, at the same time, maintain the axis of the projection lens perpendicular to the surface of the microform to provide proper focus of the lens for each and every microform image selected from the various frames on the microform. The housing for the reader includes a frame member 22 horizontally disposed and encircling the projection lens assembly 18, thereby separating the housing into the upper and lower compartments for purposes well-known in the art. The microform carrier is adaptable to be moved in a side-to-side direction and also in a fore-and-aft direction, the latter being right and left oriented, respectively, in the drawing. The carrier 16 includes framework with a lower glass or like transparent plate 24 and an upper glass or like plate 26 for containing a microform 28 therebetween in sandwich fashion, the carrier being movable as a unit in the mentioned directions with the projection lens assembly 18 riding on the upper glass plate 26.

The projection lens assembly 18 includes a tracking sleeve 32 containing a lens holder 33 and a lens 34, the sleeve 32 carrying a tracking ring 35 secured thereto and engageable with the surface of the upper glass plate 26. Connected with the lens holder 33 is an adjusting means 38 rotated by a knob (not shown) for the purpose of fine focal adjustment of the lens 34.

Figure 3:
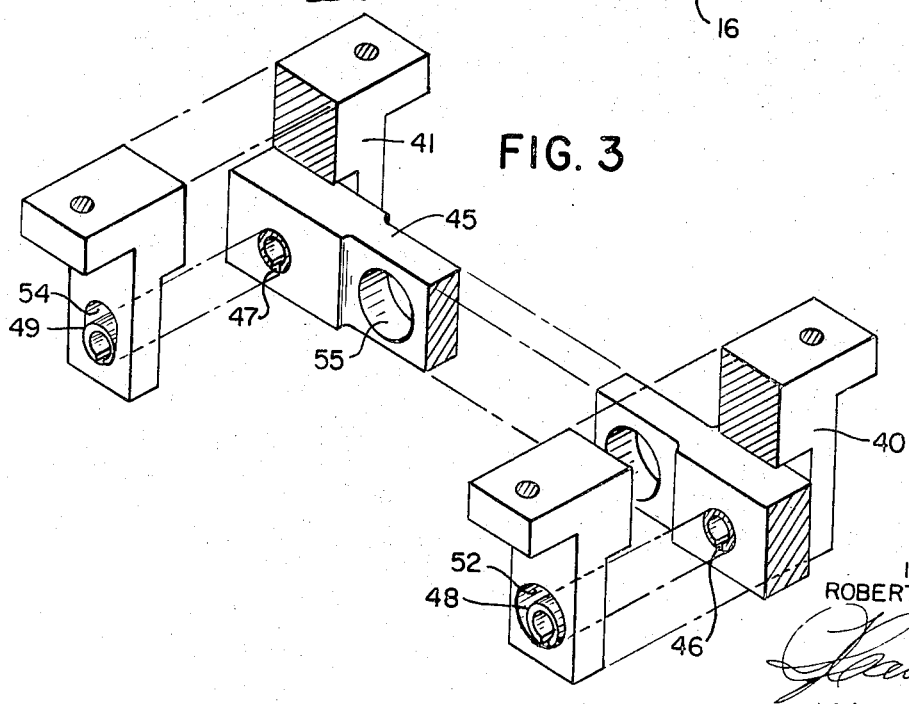
FIG. 3 is an exploded view of the lens assembly mounting means.

A pair of support members 40, 41 in the form of T-blocks are secured to the frame member 22 by suitable screws, the member 40 being termed a tracking guide block and the member 41 being termed a tracking pivot block. FIG. 3 shows these blocks in greatly enlarged manner in an exploded view and each block has a portion cut out therefrom to form a seat or recess for the projection lens mounting or supporting means in the form of an arm 45, which arm is an integral part with the tracking sleeve 32. Arm 45 has two apertures 46, 47 near the ends thereof for receiving roll pins 48 and 49 in the form of spring pins which have a slit or kerf along the length thereof for a purpose commonly known, i.e., to provide a snug fit in the receiving aperture after insertion thereof.

Guide block 40 has an aperture 52 in the nature of an oversize hole therein aligned with the aperture 46 to receive the pivot pin 48, and pivot block 41 has an aperture 54 in the nature of a vertically elongated slot therein and aligned with the aperture 47 to receive the pivot pin 49. Since there is no provision for an auxiliary means to exert pressure downwardly on the projection lens 34 or on the tracking ring 35 to maintain contact with the surface of the upper plate 26, the weight of the projection lens assembly 18 itself is relied on to provide this contact. Additionally, since the support arm 45 is an integral part of the tracking sleeve 32, a series of holes 55 are provided in the arm to adjust and compensate for loading on the lens assembly to balance the tracking mechanism and to enable the floating condition of the lens 34 with respect to the surface of the upper plate 26 for maintaining constant focus.

In FIG. 1 is shown the position of the projection lens assembly 18 and its integral supporting arm 45 when the microform carriage 16 has been drawn therefromunder or towards the right, and the pivot pins 48, 49 are therefore seated at the bottom of the apertures 52, 54, respectively, by reason of the assembly dropping slightly due to its weight. In FIG. 2 is shown the position of the parts wherein the microform carriage 16 has been moved into position under the tracking ring 35 and the pivot pins 48, 49 are centrally positioned in their respective apertures. The structure of the lens assembly 18 and support arm 45 has been designed as a unit to place the center of gravity thereof forward or to the right of the vertical axis of the lens 34 so as to provide balance of the unit in relation to the selected points of support and thus allow the assembly 18 to freely float on the surface of the upper plate 26 as the carriage 16 is moved about in selecting images to be viewed. The oversize aperture 52 in the support member 40 allows for slight up-and-down and rocking movement of the lens assembly 18, while the elongated slot 54 in member 41 allows for slight up-and-down movement of the assembly. Of course, the two lost motion connections readily cooperate in allowing the freedom of movement desired of the lens assembly 18 in maintaining proper focus of the lens in the various positions of the microform carrier by keeping the tracking ring 35 and, of course, the lens assembly 18 level with the top plate 26. The tracking operation of the projection lens assembly 18 is, therefore, independent from the mechanism utilized to open and close the cover plate 26, the arm 45 being restrained in its movement so as to support the lens assembly upon insertion and-/or removal of the microform 28.

It is thus seen that herein shown and described is a projection lens assembly mounting mechanism which permits the lens assembly to seek an optimum position for proper and uniform lens focus and which mechanism accomplishes the objects and advantages as outlined above. While only one embodiment of the invention has been disclosed herein, certain variations thereon may occur to those skilled in the art, and it is contemplated that all such variations having these features and not departing from the spirit and scope of the invention are to be construed in accordance with the following claims.

What is claimed is:

1. In a microform reader, a projection lens mounting assembly for maintaining focus of the projection lens in relation to a microform, the combination of a microform carrier having a lower and an upper transparent plate with the microform therebetween, a pair of support members connected to the reader and spaced from the projection lens, an arm securely connected with the projection lens and extending in offset manner therefrom, and a pair of lost-motion connections connecting the support members with said arm for permitting movement of the arm and of the projection lens in a direction whereby the axis of the lens is maintained substantially perpendicular to the surface of the upper transparent plate.

2. In the assembly of claim 1 wherein one of said lost-motion connections includes a pivot pin secured to the arm and one of said support members includes an elongated aperture therein for receiving the pivot pin for permitting up-and-down movement of the projection lens.

3. In the assembly of claim 1 wherein one of said lost-motion connections includes a pivot pin secured to the arm and one of said support members includes an aperture larger than the diameter of the pivot pin for permitting rockable movement of the projection lens.

4. In the assembly of claim 1 wherein the lost-motion connections include pivot pins secured to the arm and wherein one connection includes an elongated slot in the support member and the other connection includes an enlarged aperture for permitting both up-and-down movement and rocking movement of the projection lens in relation to the surface of the upper plate.

5. A projection lens mounting assembly comprising a plurality of spaced support members, arm means connected with the projection lens for support thereof, and means including pivot pins secured to said arm means for connecting said arm means and said support members, said support members having apertures therein different from the diameter of the pivot pins for permitting the projection lens to freely move in an up-and-down direction by reason of lost motion between said support members and said arm means.

6. The assembly of claim 5 wherein said support members include enlarged apertures therein permitting up-and-down movement of the projection lens.

7. The assembly of claim 5 wherein said support members include enlarged apertures therein permitting rocking movement of the projection lens.

8. The assembly of claim 6 wherein the aperture in one of said support members is an elongated slot for receiving its pivot pin and for permitting up-and-down movement of the arm means in relation to the support member.

9. The assembly of claim 6 wherein the aperture in one of said support members is larger than the diameter of its pivot pin to permit rocking movement of the arm means in relation to the support member.

10. Means for maintaining a projection lens assembly in level contact with the upper plate of a microform carrier, said means comprising a plurality of support members spaced from the projection lens assembly, and an arm having pivot pins secured thereto and connected with the projection lens assembly for support thereof and extending in a direction substantially normal to the axis of the projection lens, said support members having apertures therein different from the diameter of the pivot pins, said arm being carried by the support members in lost-motion fashion for permitting up-and-down movement of the projection lens in relation to the upper plate as said microform carrier is moved in relation to the projection lens assembly.

11. The subject matter of claim 10 wherein the aperture in one of said support members is an elongated slot for receiving its pivot pin and for permitting up-and-down movement of the arm in relation to the support member.

12. The subject matter of claim 10 wherein the aperture in one of said support members is larger than the diameter of its pivot pin to permit rocking movement of the arm in relation to the support member.

* * * * *